United States Patent [19]

Rosenberry

[11] Patent Number: 5,349,682
[45] Date of Patent: Sep. 20, 1994

[54] DYNAMIC FAULT-TOLERANT PARALLEL PROCESSING SYSTEM FOR PERFORMING AN APPLICATION FUNCTION WITH INCREASED EFFICIENCY USING HETEROGENEOUS PROCESSORS

[75] Inventor: Steven Rosenberry, Reading, Pa.

[73] Assignee: Parallel PCs, Inc., Reading, Pa.

[21] Appl. No.: 829,098

[22] Filed: Jan. 31, 1992

[51] Int. Cl.$^5$ .................. G06F 15/00; G06F 15/16
[52] U.S. Cl. .................... 395/800; 395/650;
364/230.3; 364/230.4; 364/281.3; 364/281.4;
364/281; 364/DIG. 1
[58] Field of Search .............. 395/800, 650, 575, 200,
395/375; 371/9.1, 11.3, 12, 62, 68.3

[56] References Cited

U.S. PATENT DOCUMENTS

| | | | |
|---|---|---|---|
| 4,015,243 | 3/1977 | Kurpanek et al. | 395/325 |
| 4,162,536 | 7/1979 | Morley | 395/575 |
| 4,397,021 | 8/1983 | Lloyd et al. | 371/20 |
| 4,495,570 | 1/1985 | Kitajima et al. | 395/650 |
| 4,530,051 | 7/1985 | Johnson et al. | 395/200 |
| 4,648,064 | 3/1987 | Morley | 395/275 |
| 4,769,771 | 9/1988 | Lippmann et al. | 395/200 |
| 4,839,798 | 6/1989 | Eguchi et al. | 395/650 |
| 4,920,487 | 4/1990 | Baffes | 395/650 |
| 4,951,192 | 8/1990 | Chase, Jr. et al. | 395/700 |
| 4,980,824 | 12/1990 | Tulpule et al. | 395/650 |
| 5,003,464 | 3/1991 | Ely et al. | 395/650 |
| 5,031,089 | 7/1991 | Liu et al. | 395/725 |
| 5,050,070 | 9/1991 | Chastain et al. | 395/375 |
| 5,056,000 | 10/1991 | Chang | 395/325 |
| 5,115,505 | 5/1992 | Bishop et al. | 395/650 |
| 5,193,179 | 3/1993 | Laprade et al. | 395/575 |

*Primary Examiner*—Alyssa H. Bowler
*Assistant Examiner*—Alpesh M. Shah
*Attorney, Agent, or Firm*—Panitch Schwarze Jacobs & Nadel

[57] ABSTRACT

A parallel processing system performs an application function by a plurality of processing unit contained within a single network. The parallel processing system includes at least one slave unit connected to a common network and capable of processing a specified amount of data at a particular processing speed. At least one master unit, which may include a local slave unit, is connected to the common network and initiates an application function to be processed by the slave units. The slave units are polled to determine the processing power of each slave unit, the resources available to each slave unit and the availability of each slave unit. One or more slave units are engaged in processing the application function. If a plurality of slave units are selected, the application function is divided into a plurality of portions of data and each portion is assigned and communicated to a specific slave unit for processing. Predetermined calculations are performed on each portion of data by each slave unit.

26 Claims, 6 Drawing Sheets

DYNAMIC FAULT-TOLERANT PARALLEL PROCESSING SYSTEM FOR PERFORMING AN APPLICATION FUNCTION WITH INCREASED EFFICIENCY USING HETEROGENEOUS PROCESSORS

BACKGROUND OF THE INVENTION

The present invention relates to a parallel processing system and, more particularly, to a parallel processing system for performing an application function by a plurality of processing units contained within a single network.

A typical parallel processing system comprises a plurality of processing units which are interconnected within a single network which together compute the result of a solvable problem. An advantage of the parallel processing system is the increased computing power derived from combining the processing power of several processing units. Typically, many prior art parallel processing units require a known, unchanging parallel processing system to be used. A function which is to be parallel processed is divided and communicated to a plurality of units such that each unit processes a portion of the entire function. Once each processing unit has completed processing its portion of the function, the processed portions of the function are combined to provide a completed function. However, many prior art parallel processing systems arbitrarily divide the application function among the plurality of processing units such that each processing unit completes its portion of the function at a different time. This leads to inefficient use of processing time. In addition, many of the processing units in the network typically are not utilized which further lowers the efficiency of the system.

An important aspect to parallel processing systems is the ability of the system to withstand equipment failures in individual processing units and the capability of continued operation. If a parallel processing system is unable to detect a failure in one of its processing units, the system will be unable to complete the processed function. Since the likelihood of a failure occurring during the computation of a given function is significantly high, a parallel processing system which is unable to detect failures is ineffective. On the other hand, if the parallel processing system can detect failures within a single processing unit, but the time necessary to check each processing unit is significant, the fault detect feature will counterbalance any benefit derived by using the parallel processing system.

There is a need for a parallel processing system which is capable of effectively dividing and processing an application function within a minimal amount of time in a processing environment that may change between subsequent executions of the application function. In addition, the parallel processing system should not affect the normal operations of each processing unit. Therefore, when a particular processing unit is not involved in a parallel process, the processing unit may engage in normal processing operations. The parallel processing system should be capable of running on any operating system and should include a plurality of processing units contained within a single network. A master unit controls the operating flow of the application function and divides the function among a plurality of slave processing units such that each processing unit completes its portion of the function at approximately the same time. Once each slave processing unit completes its portion of the application function, the processed data is transferred back to the master processing unit. In the event that a failure occurs in one of the processing units, the master processing unit reassigns the portion of the function allotted to the failed processing unit to another processing unit such that a completed application function can be performed.

SUMMARY OF THE INVENTION

A parallel processing system performs an application function by at least one processing unit contained within a single network. The parallel processing system comprises at least one slave unit. Each slave unit is connected to a common network and is capable of processing a specified amount of data at a particular processing power. At least one master unit is connected to the slave units through the common network. The master unit initiates an application function which is to be processed by the slave units. A polling means polls the slave units to determine the processing power of each slave unit and the resources available to the slave unit. A receiving means receives from each slave unit the processing power and the resources available to each slave unit. A selecting means selects a number of slave units to be engaged in processing said application function. A dividing means divides the application function in a manner defined by the application function into a plurality of specified portions of data. Each specified portion of data is communicated to a different slave unit for processing. A calculating means performs predetermined calculations as defined by the application function on each specified portion of data by each slave unit. An optional merging means merges each calculated portion of data in a manner defined by the application function at said master unit. The merged data represents the processed application function.

A method for performing parallel processing of an application function by at least one processing unit contained within a single network polls a plurality of slave units to determine the processing power of each slave unit. The master unit receives the processing power of each slave unit. The master unit selects a number of slave units to be engaged in processing the application function. The application function is divided in a manner defined by the application function into specified portions of data. Predetermined calculations as defined by the application function are performed on the specified portions of data. The calculated specified portions of data are optionally merged in a manner defined by the application function at the master unit to provide the application function.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed.

In the drawings.

DESCRIPTION OF PREFERRED EMBODIMENT

Figure 1:
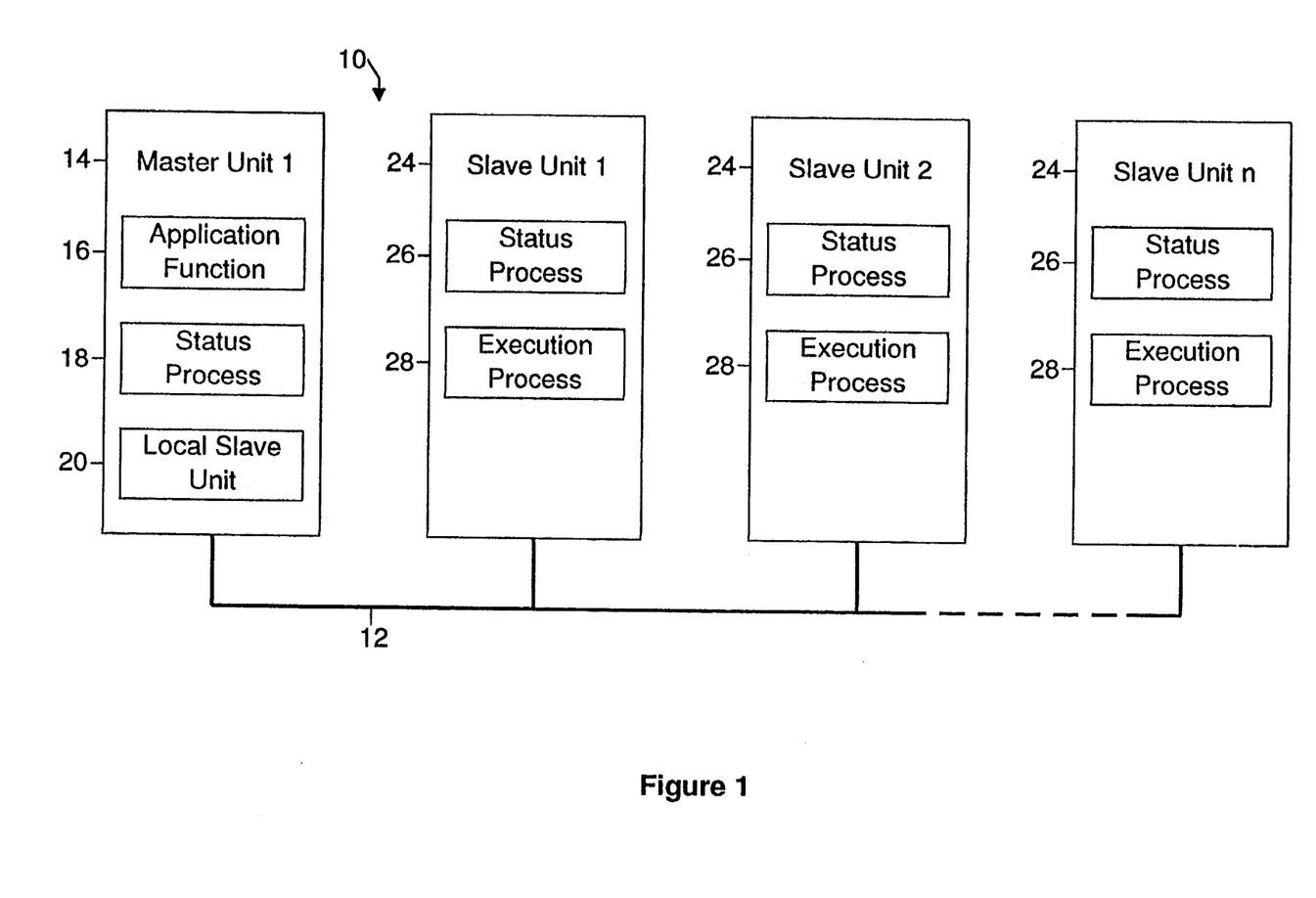
FIG. 1 is a general block diagram of a parallel processing system in accordance with the present invention.

Referring to the drawings, wherein like numerals indicate like elements throughout, there is shown in FIG. 1 a schematic block diagram of a parallel processing system 10 in accordance with the present invention. The parallel processing system 10 contains a plurality of processing units which are contained within a single communications network 12. In the preferred embodiment, the network 12 is a local area network. However, it is to be understood by those skilled in the art that any particular type of local area network can be used or any other suitable means of communications without departing from the scope and spirit of the present invention. Each processing unit is preferably a conventional computer which includes a central processing unit (CPU), memory and file storage and as such will not be described in further detail. The processing unit may be defined as a process or a group of cooperative processes which execute on one or more CPUs. In the preferred embodiment, each CPU operates under the control of a multi-tasking operating system, such as, but not limited to, UNIX, OS/2 or any other suitable operating system.

The parallel processing system 10 includes at least one master unit 14 which stores an application function 16 which is to be executed by the parallel processing system 10. The application function 16 is preferably an application program that performs a specific function or functions of interest to the unit operator. For example, the application function 16 could relate to word-processing or calculating spread sheets. The master unit 14 also includes a status process 18 which monitors the use of the CPU within the master unit 14 and provides information relating to the operating system and the resources available to the particular unit. Such information can include the file storage space, the presence of a math co-processor, the amount of the available memory or any other resource information necessary to determine the suitability of a processing unit to perform a specific application. The master unit 14 includes a local slave unit 20 which is capable of processing a portion of or all of the application function 16. In the preferred embodiment, the local slave unit 20 uses the same CPU as the master unit 14.

Also contained within the network 12 are one or more remote slave units 24 which are capable of performing at least a portion of the processing of the application function 16. Each slave unit 24 contains a status process 26 which is capable of providing information relating to the resources available to the particular slave unit 24, and the processing power of the slave unit 24. An execution process 28 executes a portion of the application function once it is distributed to the particular slave unit 24. It is to be understood by those skilled in the art that any unit contained within the network 12 is capable of being designated as the master unit 14 so long as the unit is capable of executing an application function. It is further to be understood that more than one unit contained within the network can be a master unit 14 at the same time. The selection of a slave unit 24 used to process a particular application function may depend upon the availability of the slave unit 24 and the power with which the slave unit 24 is capable of processing the application function. In addition, if a particular slave unit 24 is processing its own application function or an application function from a different master unit 24, the slave unit 24 will be unavailable to the polling master unit 14.

Figure 2:
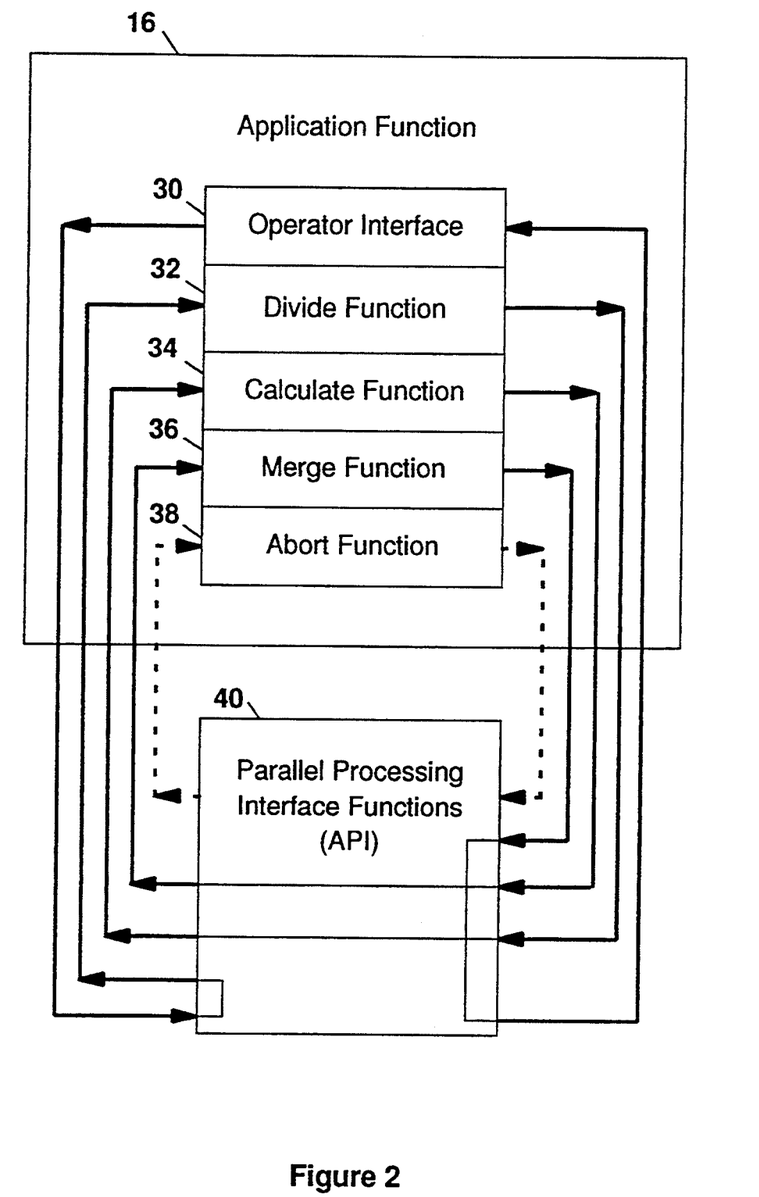
FIG. 2 is a general block diagram of an application function to be processed by the parallel processing system of FIG. 1.
Figure 3A:
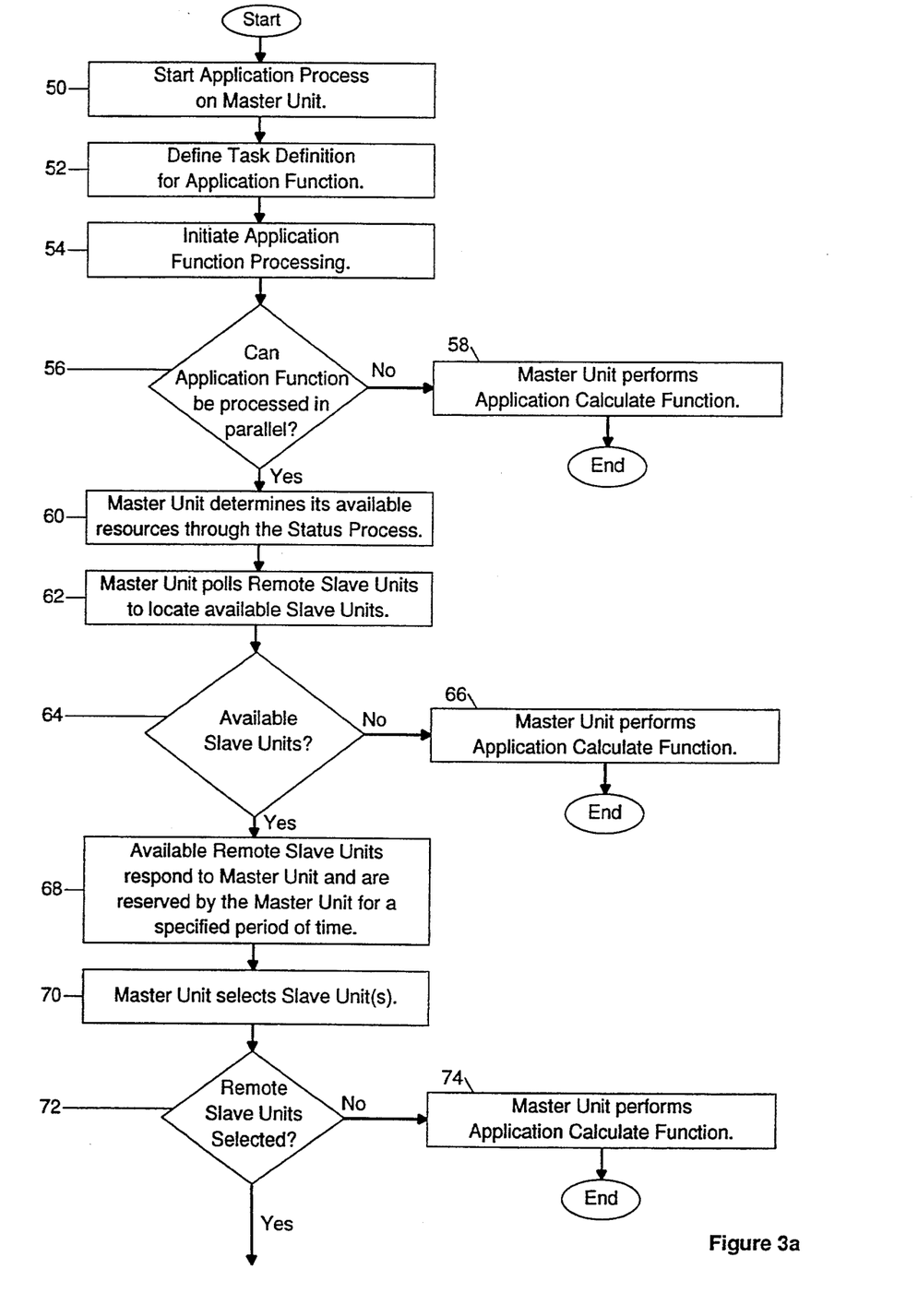
FIGS. 3a–3d are flow diagrams depicting the general operation of the parallel processing system of FIG. 1.
Figure 3B:
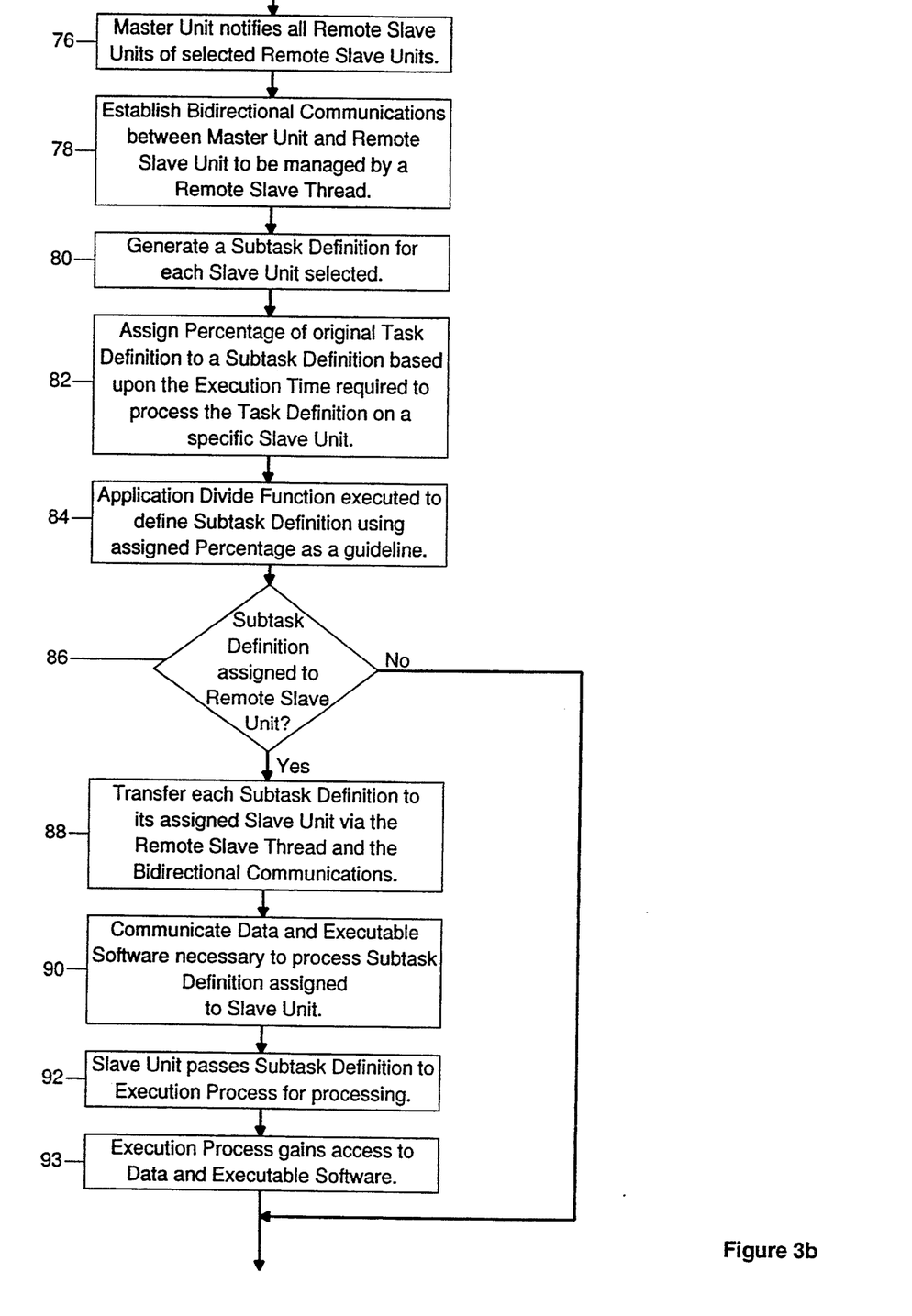
Figure 3C:
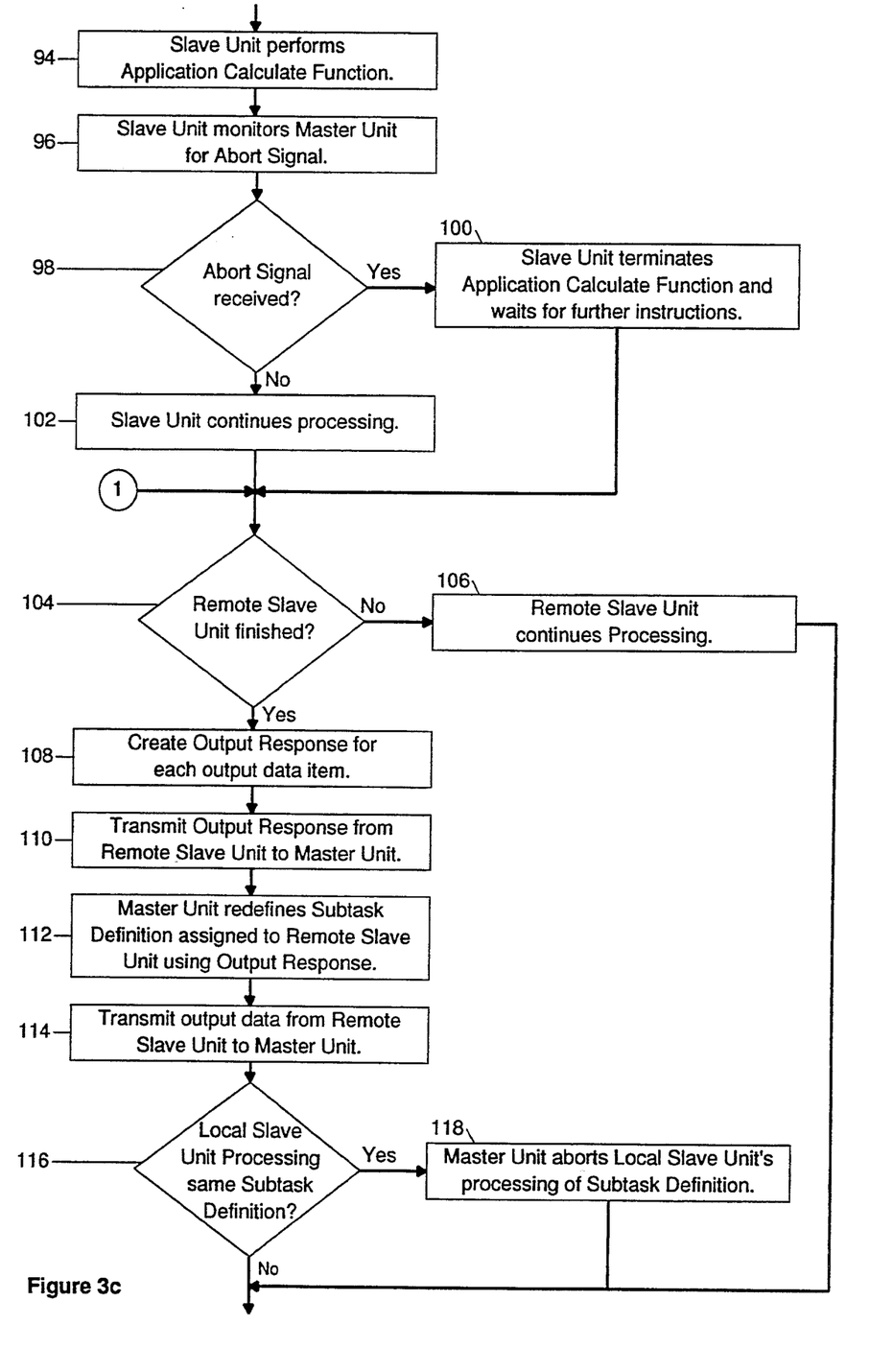
Figure 3D:
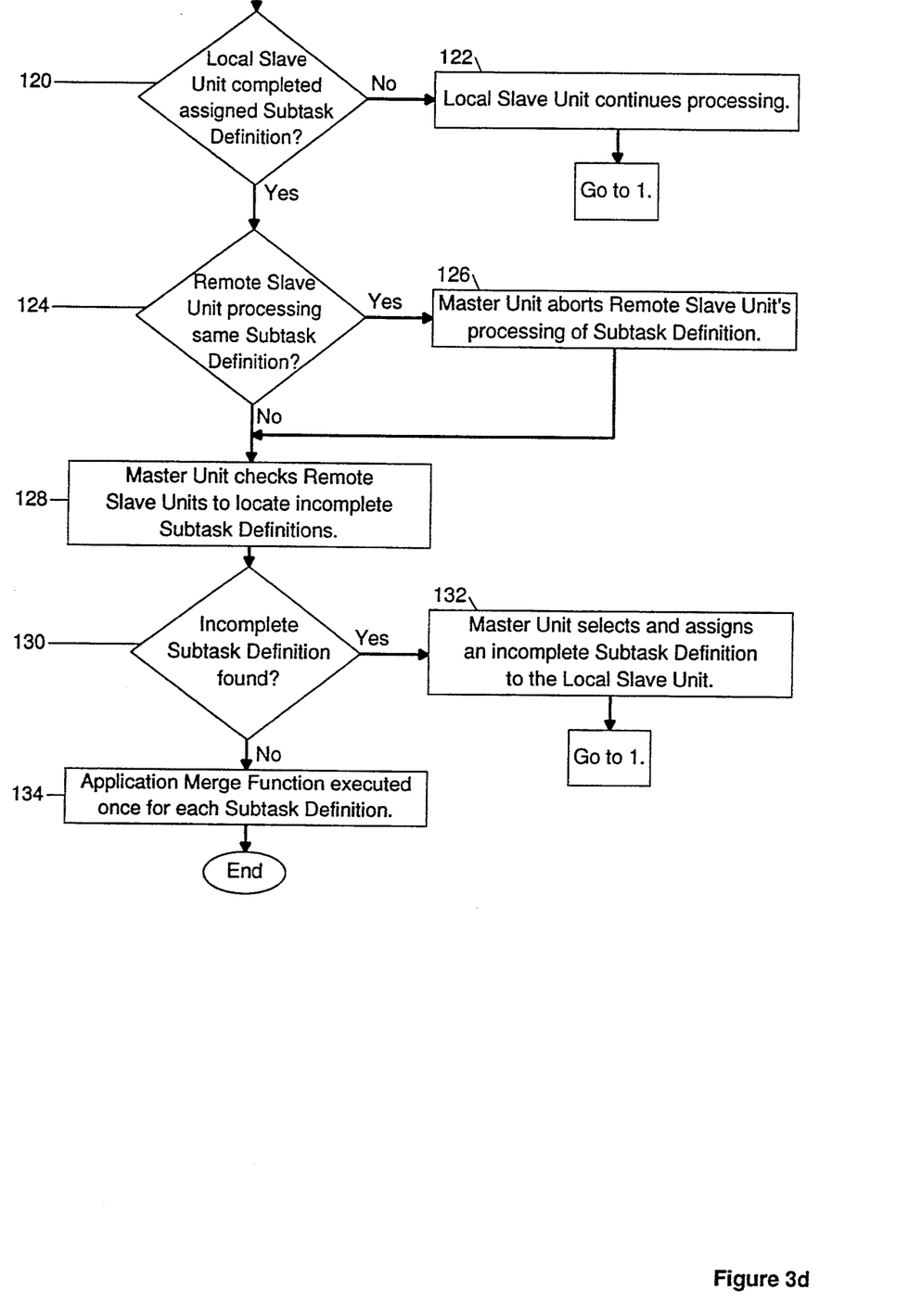

Referring to FIG. 2, there is shown a general block diagram of the processing of an application function 16 by the parallel processing system 10. An operator interface 30 communicates data between the application function 16 and a computer operator. A communication may be, but is not limited to, a command with parameters that cause the application function 16 to execute or a graphical operator interface with menus.

A divide function 32 provides a strategy defined by the application function 16 for dividing an application calculate function among multiple units. The divide function 32 typically divides input and output data blocks into smaller ones. The divide function 32 is primarily based on the processing power of each unit as will be described in further detail hereinafter.

A calculate function 34 generates a desired output through programmed manipulation, as defined by the application function 16, of input data received from the master unit 14. The generated output can be processed data or performance of a specified action such as, but not limited to, data base records, numerical results, graphical displays, printing of reports or control of a process. It is to be understood by those skilled in the art that any application function 16 which is capable of being parallel processed can be generated by the calculate function 34.

A merge function 36 provides a strategy defined by the application function 16 for merging outputs from the different units which execute the calculate function 34. The merge function 36 is an optional function and is not necessary for completing the processing of an application function. For certain application functions, such as processing an array of numbers, for example, each processed portion of data may be communicated from the remote slave units 24 to the master unit 14 in a manner that eliminates the need for a merge function.

An abort function 38 selectively discontinues the execution of the calculate function 34 and is part of the fault tolerance processing. Typically, the abort function 38 is determined by the particular calculate function 34 being applied. The abort function 38 is also optional. The presence of the abort function 38 oftentimes provides better performance and more controllable terminations of the calculate function 34.

Application processing interface functions (API) 40 provide a means for an application function 16 to access parallel processing services provided by other slave units. An application function 16 is defined by a task definition. A task definition contains all of the information necessary for the execution of a calculate function 34. Among the information included in the task definition is the location and quantity of any input data required by the calculate function 34, destinations of and quantity of any output data expected to be generated by the calculate function 34, identification and location of the application defined functioning, information concerning minimum resource requirements a unit must have to execute the calculate function 34 and information to estimate the execution time of the calculate function 34 on a given unit.

The API functions 40 define the use of and content of the process control data used by the divide function 32 and the merge function 36. The process control data includes the total number of times the divide function 32 or merge function 36 should expect to be executed, the sequence number of the current execution of the divide function 32 or merge function 36, and other information necessary to control the application's divide function 32 or merge function 36. The API functions 40 also define the use of, but not the content of, the application control data. The application control data is used by the divide function 32 and the merge function 34 to manage the progress of their respective executions and the use of any additional system resources required when processing the application function in parallel. The API functions 40 control the allocation of the application control data and its assignment to subtask definitions.

In determining which slave units 24 will aid in the processing of an application function, the status process 18 or 26 determines the availability and type of resources available to the processing unit on which the status process 18 or 26 is executing. Information necessary for determining the status of a processing unit includes, but is not limited to, the following: the CPU type, the type of operating system, the organization method used by the mass storage device, the unit's base processing power as measured when used to process a single application, the unit's current processing power which is the amount that is currently available for use in processing a task definition, and the amount of free file space that is available for use in processing a task definition. The processing power of a particular remote slave unit 24 or local slave unit 20 is determined by estimating the execution time required by the slave unit to process a given task definition. Typically, the processing power depends upon the slave unit's CPU speed, available memory resources, and the availability of any specialized hardware that may be particularly suited to processing a given task definition.

The status process 18 determines the CPU speed of a particular unit by maintaining a record of its speed over one or more periods of time. The recorded CPU speeds are averaged to provide a CPU speed appropriate for determining a slave unit's processing power for the given task definition.

Slave units 24 compare their available resources as determined by status process 26 with the amount of resources required to complete the application function 16. Only slave units 24 which meet the requirements of the application function 16 will respond when polled by the master unit 14. Also the slave units 24 must be in an idle state. In the preferring embodiment, the idle state may be determined by: 1) comparing the slave unit's current processing power with its base processing power, and 2) comparing the slave unit's current processing power with the current processing power of the master unit 14 which is polling the slave units 24. However, it is to be understood by those skilled in the art that the idle state may be determined by any other suitable means without departing from the scope and spirit of the present invention. If the slave unit 24 is determined to be busy (not idle), the slave unit 24 will not respond.

Referring to FIGS. 3a-3d, there is shown a detailed flow diagram depicting the operation of the parallel processing system 10. An application function 16 to be processed by the parallel processing system 10 begins processing on the master unit 14 at block 50. API functions 40 are used to create and define one or more task definitions for the application function 16 in block 52. The task definition is placed on a task list to be processed in a logical manner by an appropriate combination of the master unit 14, the local slave unit 20 and one or more of the remote slave units 24.

Once a task list has been formulated, the application function processing is initiated at block 54. In block 56, it is determined whether the application function can be processed in parallel. If the application function 16 cannot be processed in parallel, stand-alone processing may be performed by the master unit 14 at block 58.

If it is determined that the application function 16 may be processed in parallel, the master unit first determines the amount of resources available to the master unit 14 by checking the status process 18 at block 60. The status process 18 includes information, such as the processing power of the local slave unit 20 and the available resources. In block 62, the master unit 14 polls the remote slave units 24 in an attempt to locate available slave units by sending a status request message. The status process 26 of each remote slave unit 24 provides the processing power and resources available for use by the master unit 14. The remote slave units 24 may return a number of possible responses.

If no slave units 24 are available to master unit 14, then the master unit 14 will initiate processing of the application calculate function 34 in block 66. Those slave units 24 which are available to aid in the processing of the application function 16 will send a message back to the master unit 14 in block 68. The slave unit 24 will respond in the affirmative that it has the necessary resources to process the application function 16. Slave units 24 responding in the affirmative are reserved for use by the master unit 14 for a specified period of time or until they receive notification that they have not been selected by the master unit 14. If the slave unit is unavailable, the message may indicate that the particular slave unit is already reserved but not in use by another master unit. Once the master unit 14 has received responses from all responding slave units 24, the master unit 14 must select the slave units which will perform the application function 16 in block 70. The master unit 14 typically selects those slave units 24 which have the most processing power to complete the application function 16. Once the master unit 14 has selected the slave units 24 to process the application function 16, the master unit 14 then notifies all slave units of the selected units 24 in block 76. A slave unit which has not been selected to process the application function 16 and receives the master unit 14 response, will immediately make itself available to other units requiring parallel processing. A slave unit 24 which has been selected by the master unit 14 will commit itself to the master unit 14 provided that it is still available for processing. In the event that a selected slave unit 24 is no longer available for processing, the master unit 14 will either assume that slave unit's processing responsibilities through the fault-tolerance mechanism or select an alternate slave unit for processing. If no remote slaves were selected, the master unit 14 will initiate processing of the application calculate function 34 in block 74.

When the selected slave units 24 receive notification of their selection, bidirectional communications are established between the master unit 14 and each remote slave unit 24 via a separate remote slave thread at block 78. In the preferred embodiment, the remote slave thread is a "lightweight" process executing under the control of the master unit 14. A lightweight process is one that is easily scheduled for execution by the operating system without the overhead of scheduling an actual process. The remote slave thread communicates data, executable software and processing information to and from the master unit 14 and the slave units 24. If at any time during the processing an unrecoverable error occurs in the bidirectional communications, the bidirectional communications will be severed. When this occurs, the slave unit 24 is immediately available for use by other master units 14. Subtask definitions assigned to the slave unit 24 with which bidirectional communications were lost will be processed by the master unit 14 according to the fault-tolerance mechanism.

Once the slave units 24 have been notified of the selections made by the master unit 14, subtask definitions for the selected slave units 24 and the local slave unit 20 are generated at block 80 for parallel processing by the slave units. Each subtask definition comprises a portion of the original task definition. The portion of the task definition which is assigned to each subtask definition is dependent upon the execution time required by a specific slave unit to process a portion of the task definition in comparison with the execution times required by the remaining slave units. The percentage of the task definition assigned to each subtask definition is determined at block 82. A divide function 32, provided by the application function 16, is used to define each subtask definition for the application function 16 at block 84. The divide function 32 may deviate from the assigned percentage. In the preferred embodiment, the division of the task definition into subtask definitions is organized such that each subtask definition requires substantially the same amount of processing time. However, it is to be understood by those skilled in the art that the subtasks may contain any arbitrary percentage of the task definition without departing from the scope and spirit of the present invention.

The percentage of the task definitions assigned to each slave unit 24 is determined in the following manner for all but the last assigned slave unit:

$$\text{Assigned \%} = \frac{(\text{Slave's Current Power})(100 - \text{Total Percentage})}{\text{Total Power of Still Unused Slaves}} \quad (1)$$

For the first slave unit assignment, the total percentage is set to zero. For each subsequent slave unit assignments, the total percentage is equal to the sum of the completed slave unit assignments assigned by the divide function 32. A counter is set to one for the first execution of the divide function 32 and incremented by one for each subsequent divide function 32. The maximum count for the counter is set equal to the number of slave units 24 expected to participate in processing the application function 16. The percentage assigned to the last slave unit is determined by the equation:

$$\text{Assigned to Last Slave Unit} = 100\text{-Total Percentage} \quad (2)$$

Once the value of the total percentage is greater than or equal to one hundred, no more calls to the divide function 32 are made. The divide function 32 is expected to return the percentage of the original task definition actually assigned to a subtask definition. The divide function 32 receives the requested percentage of the task definition to be assigned to the subtask definition and the counter values through the process control data as described above. The divide function 32 also has application control data allocated for its use.

Each subtask definition assigned to a remote slave unit 24 is communicated to the assigned slave unit 24 via the remote slave thread at block 88. Also, the data and executable software necessary for processing the subtask definition are communicated to the slave unit 24 via the remote slave thread at block 90. In addition, in the preferred embodiment, a caching mechanism may be used to store some executable software and some data at the slave unit 24. The caching mechanism eliminates the need for communicating the same information to the remote slave unit 24 during subsequent executions of the application function 16.

Once each portion of data has been received by the assigned slave unit 24, each slave unit 24 begins performing the necessary calculations via the execution process 28 at block 92. Prior to performing the calculations, the execution process 28 of each remote slave unit 24 must gain access to all resources required by the calculate function 34 at block 93. Accessing these resources includes locating and gaining permission to access the input, output and constant data assigned to the task definition. If one of the necessary resources cannot be located or accessed, the execution process 28 terminates operation and indicates a system failure.

Once all of the necessary resources are located, the calculate function 34 is executed at block 94. The calculate function uses API functions 40 to locate the data to be processed and to determine the destination of the output data.

While each slave unit 24 is processing the subtask definition or portion of data assigned by the master unit 14 during the calculate function 34, the slave unit 24 monitors the master unit 14 for detection of an abort signal at block 96. A master unit 14 may signal an abort if the local slave unit 20 has already completed the assigned subtask definition or in the event that the application function 16 is aborted. If the slave unit 24 receives an abort signal, the slave unit 24 terminates its execution process 28 and waits for further instructions from the master unit 14 at block 100. If the slave unit does not receive instructions from the master unit within a predetermined period of time, the slave unit 24 becomes available to all other master units. If the slave unit 24 does not receive an abort signal, the slave unit 24 continues the execution process in block 102.

Typically, a subtask definition is assigned to the local slave unit 20 of the master unit 14 for processing. Once the local slave unit 20 completes the processing of its assigned subtask definition and redefines the subtask definition to represent the actual output data generated by the execution of the application calculate function 34, the master unit 14 checks all slave units 24 to locate those slave units which have not completed their assigned subtask definition at block 128. A slave unit 24 may not complete its subtask definition due to a system error or to a slower than expected processing speed. The master unit 14 selects and assigns one of the incompleted subtask definitions for processing by the local slave unit 20 at block 132. If the remote slave unit 24 completes the subtask definition assumed by the local slave unit 20, then the local slave unit 20 aborts the processing of the subtask definition at block 118. The master unit 14 may then assign a different incompleted subtask definition from a different slave unit at block 132. If the local slave unit 20 completes the subtask definition prior to the assigned remote slave unit, the master unit 14 signals an abort to the remote slave unit to discontinue processing the subtask definition at block 126. The master unit 14 may check the slave units 24 at other times and may also assign subtask definitions to remote slave units.

As the execution process 28 for each slave unit 24 completes its assigned subtask definition, the subtask definition is redefined to represent the actual output data that was generated by the execution of the application calculate function 34 and is to be returned to the master unit 14. The new definition is used to create one or more output response messages at block 108 which are communicated to the remote slave thread at block 110. The remote slave thread uses the output response to redefine the subtask definition at the master unit 14 in block 112. The actual output data is now communicated form the slave unit 24 to the master 14 via the remote slave thread and the bidirectional communications at block 114.

Once the processing of all the subtask definitions has been completed including reception of all output data from remote slave units 24, the master unit 14 merges the output data and produces the resulting processed application function 16 at block 134. As each slave unit 24 completes its subtask definition, the slave unit 24 is available for processing by another master unit 14. At any time during the processing of a subtask definition by a slave unit 24 for a master unit 14, the slave unit 24 is available for local processing. Local processing will have priority over the processing of a subtask definition for another master unit 14. This may prevent the completion of the subtask definition processing for the master unit 14. In this case, the master unit 14 will process that subtask definition through the fault-tolerance mechanism.

The merge function 36 combines the output data from separate subtask definitions into locations specified by the original task definition and releases any system resources allocated during the execution of the divide function 32. The merge function 36 can use API functions 40 to retrieve information needed to determine how the output data is to be merged and what resources should be released. The merge function 36 may take advantage of the process control data and application control data as defined earlier.

The following is a specific example of a type of application function which may be processed by the parallel processing system of the present invention. It is to be understood by those skilled in the art that the following application function is merely exemplary and that any suitable type of application function may be processed by the parallel processing system. One type of application function which may be processed by the master unit 14 is the creation of a document using a word processing software program and including the function of spellchecking the document. In the preferred example, the document to be spellchecked is a lengthy document which would take a considerable amount of time for the master unit to spellcheck alone.

The document is defined in the application function, hereinafter referred to as the spellcheck function, as being capable of being parallel processed. A task definition is created which defines the document to be spellchecked. The master unit 14 polls a plurality of remote slave units 24 contained within a single network to determine if there are any available remote slave units 24 to process the document. If no slave units are available, the master unit 14 spellchecks the entire document.

Those remote slave units which are capable of performing the spellcheck function, i.e., which have the available resources and an adequate processing power, will respond to the master unit 14. The maximum number of remote slave units 24 that may be used by the master unit 14 are defined within the spellcheck function. In this particular example, it is assumed that the master unit can reserve up to four remote slave units 24 to complete the spellcheck function. It is to be understood by those skilled in the art that while four slave units is the chosen number of slave units to process the spellcheck function, that fewer slave units or no slave units may be used by the parallel processing system in the processing of the document.

The master unit 14 reviews the affirmative responses from the responding slave units 24 and selects up to four slave units 24 which have the most processing power. Once the slave units 24 have been selected by the master unit 14, the master unit 14 communicates a connect request message to all responding slave units 24 which indicates the chosen slave units and enables the unchosen slave units to be freed for use by other master units 14. In the event that the slave unit 24 is no longer available to the master unit 14, the master unit will reassign that portion of the spellcheck function which was to be assigned to the particular slave unit through the fault tolerance mechanism.

Next, a subtask definition which will contain a portion of the document and the software necessary to complete the spellcheck function by a slave units 20, 24 is created for each slave unit 20, 24. The divide function 32 is executed once for each subtask definition to divide the document among the subtask definitions to be processed by the slave units 20, 24. If the processing power of the slave units 24 and the local slave unit 20 are equal, the document can be equally divided among the remote slave units 24 and the local slave unit 20. In this case, since there are five slave units, including the local slave unit 20, the document can be divided into five equal portions. If, for example, the document is 100 pages long, each slave unit will spellcheck 20 pages of the document. If the processing power of the slave units differ, the subtask definitions will contain proportional amounts of the document such that each slave unit can complete its subtask definition at substantially the same time. For example, if the processing power of one of the slave units 24 is twice as much as another slave unit, the more powerful slave unit will receive twice as much of the document to be spellchecked as the less powerful slave unit.

Once each slave unit receives a subtask definition, it also receives the necessary data and executable software for spellchecking the document. The remote slave units 24 and the local slave unit 20 then perform the necessary calculations in order to spellcheck the document. Once the local slave unit 20 has finished spellchecking its portion of the document, the master unit 14 will determine if any of the slave units 24 have not yet completed their assigned subtasks, either due to being executed slower than was expected or a failure occurring at the slave unit. If the master unit 14 detects an incomplete subtask definition, the master unit 14 will assign the subtask definition to the local slave unit 20 to spellcheck that portion of the document. If the slave unit 24 finishes spellchecking the portion of the document prior to the local slave unit 20, the master unit 14 will abort spellchecking that portion of the document being performed by the local slave unit 20. If the local slave unit 20 completes spellchecking the document prior to the assigned remote slave unit 24, the master unit will abort the spellchecking of the document being performed by the remote slave unit 24.

As each remote slave unit 24 completes the subtask definition, the processed subtask definition is redefined to represent the actual output data generated by the calculate function 34 which in this example may be a list of misspelled words and their locations within the document. One or more output responses are communicated by the remote slave to the master unit 14 via the remote slave thread. As each output response is received by the master unit 14, the subtask definition at the master unit 14 is also redefined and the actual output data is received from the remote slave unit 24. The master unit 14 combines all of the output data received from the remote slave units 24 and the output data generated by the local slave unit 20 to obtain a completed list of errors within the spellchecked document. The list of errors within the spellchecked document can then be further processed by the master unit 14 as may be further defined in the application function.

From the foregoing description, it can be seen that the present invention comprises a flexible parallel processing system for performing an application function by at least one processing unit contained within a single network. It will be appreciated by those skilled in the art that changes could be made to the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. A parallel processing system for performing an application function by a plurality of processing units contained within a common network, the parallel processing system comprising:

a plurality of slave units connected to the common network, each slave unit adapted to process a given amount of data specified by the application function at a particular processing power, each slave unit providing an indication of availability, present status, processing power, and resources available;

at least one master unit connected to said slave units and said common network, said master unit initiating an application function which is to be processed by said slave units, said master unit providing an indication of processing power and resources available;

pro-active polling means for polling said slave units and master unit to determine the processing power of each slave unit and the master unit, the resources available to each slave unit and said master unit, and the availability of each slave unit;

receiving means for receiving from each slave unit and master unit the processing power and resources available to each slave unit and the master unit;

selecting means for selecting one or more slave units to be engaged in processing said application function, said selection based upon the received processing power and resources available to each slave unit and the master unit and the availability of each slave unit;

dividing means for dividing said application function in a manner defined by the application function into a plurality of specified portions of data, each specified portion of data being assigned and communicated to a different specific slave unit for processing; and calculating means for performing predetermined calculations defined by the application function on each said specified portion of data by each slave unit;

each slave unit including means for being accessible for performing local processing, the local processing having priority over and discontinuing the processing of the specified portion of data assigned to the slave unit, the master unit including means for having the option to select an alternate unit for processing the specified portion of data assigned to a slave unit performing local processing, the alternate unit being selected from the master unit and available slave units.

2. A parallel processing system according to claim 1, further including merging means defined by the application function for optionally merging each calculated portion of data at said master unit, said merged data representing a processed application function.

3. A parallel processing system according to claim 1 wherein said polling means further includes estimating means for estimating the processing power of each slave unit.

4. A parallel processing system according to claim 1, wherein said common network is a local area network.

5. A parallel processing system according to claim 1, wherein said master unit can be any one of the processing units located within the common network.

6. A parallel processing system according to claim 5, wherein said master unit includes a local slave unit.

7. A parallel processing system according to claim 6, wherein said local slave unit performs at least a portion of the processing of the application function.

8. A parallel processing system according to claim 1, further comprising fault tolerance means for determining the present status of each slave unit and for detecting an uncompleted calculated portion of data.

9. A parallel processing system according to claim 1, further comprising fault tolerance means for determining the present status of each slave unit and for detecting a fault occurring at the slave unit.

10. A parallel processing system according to claim 8, further comprising data assigning means for assigning a portion of data which has been originally assigned to a remote slave unit which is still calculating the portion of data to another slave unit for performing calculation functions on the assigned data.

11. A parallel processing system according to claim 9, further comprising data assigning means for assigning a portion of data originally assigned to a failed remote slave unit to another slave unit to perform the predetermined calculations on the assigned data.

12. A parallel processing system according to claim 1 wherein said master unit is adapted to process a particular application function as a single execution process.

13. A method for performing parallel processing of an application function by a plurality of processing units contained within a single network, said processing units including a plurality of slave units, each slave unit adapted to process a specified amount of data defined by the application function at a particular processing power, and at least one master unit contained within the network, said master unit initiating the application function which is to be processed and including a local slave unit, each slave unit being accessible for performing local processing, the local processing having priority over and discontinuing the processing of the specified amount of data, said method comprising the steps of:

a) estimating at each slave unit the processing power of the slave unit;
b) polling each slave unit pro-actively to determine the processing power and availability of each slave unit;
c) receiving the processing power and availability of each slave unit;
d) selecting a number of slave units to be engaged in processing said application function, said selection based upon the received processing power and availability of each slave unit;
e) dividing said application function in a manner defined by the application function into specified portions of data;
f) assigning each specified portion of data to a different specific selected slave unit;
g) performing at each specific selected slave unit predetermined calculations defined by said application function on each said specified portion of data and producing calculated specified portions of data; and
h) optionally selecting an alternate unit for processing the specified portion of data assigned to a slave unit performing local processing, the alternate unit being selected from the master unit and available slave units.

14. A method according to claim 13 further comprising the step of:
h) merging, as defined by the application function, the calculated specified portions of data at said master unit to provide a processed application function.

15. A method according to claim 13, further comprising the steps of:
i) determining which remote slave units have not completed calculating their assigned portion of data; and
j) assigning the specified portion of data originally assigned to the remote slave unit to another slave unit.

16. A method according to claim 13, further comprising the steps of:
k) determining which remote slave units have failed; and
l) assigning the specified portion of data originally assigned to the failed remote slave unit to another slave unit.

17. A parallel processing system for performing an application function by a plurality of processing units contained within a common network, the parallel processing means comprising:
a plurality of remote slave units, each remote slave unit being interconnected to other remote slave units by a common network and adapted to process a specified amount of data defined by the application function at a particular processing power, said remote slave units providing indications of availability, processing power, and resources available;
a master unit connected to said remote slave units and said common network, said master unit initiating an application function which is to be processed by said remote slave units, said master unit providing an indication of processing power and resources available;
pro-active retrieving means for retrieving from said slave units and said master unit the processing power of each remote slave unit and the master unit, the resources available to each remote slave unit and the master unit, and the availability of each remote slave unit;
selecting means for selecting a number of remote slave units to be engaged in processing said application function, said selection based upon the processing power, the resources available, and the availability retrieved from each remote slave unit; and
dividing means for dividing said application function in a manner defined by said application function into specified portions of data, each specified portion of data being assigned to a different specific remote slave unit for processing;
each slave unit including means for being accessible for performing local processing, the local processing having priority over and discontinuing the processing of the specified portion of data assigned to the slave unit, the master unit including means for having the option to select an alternate unit for processing the specified portion of data assigned to a slave unit performing local processing, the alternate unit being selected from the master unit and available slave units.

18. A parallel processing system according to claim 17, wherein said master unit includes a local slave unit.

19. A parallel processing system according to claim 18, wherein said local slave unit receives a specified portion of data for processing.

20. A parallel processing system according to claim 17, further comprising calculating means for performing predetermined calculations defined by said application function on said specified portions of data by said remote slave units and said local slave unit.

21. A parallel processing system according to claim 20, further comprising optional merging means defined by the application function for merging each calculated portion of data at said master unit, said merged data representing a processed application function.

22. A parallel processing system according to claim 17, wherein said master unit can be any processing unit located within the common network.

23. A parallel processing system according to claim 21, further comprising fault tolerating means for detecting at a completion of a given event those remote slave units which are still calculating a portion of data.

24. A parallel processing system according to claim 23, further comprising data assigning means for assigning the portion of data which has originally been assigned to said remote slave unit which is still calculating the portion of data to another slave unit for performing the calculating functions on the assigned data.

25. A parallel processing system according to claim 21, further comprising fault tolerating means for detecting at a completion of a given event those remote slave units which have failed.

26. A parallel processing system according to claim 25, further comprising data assigning means for assigning the portion of data originally assigned to a failed remote slave unit to another slave unit to perform the predetermined calculations on the assigned data.

* * * * *